(12) United States Patent
Katsube et al.

(10) Patent No.: US 12,148,573 B2
(45) Date of Patent: Nov. 19, 2024

(54) MULTILAYER CERAMIC ELECTRONIC COMPONENT WITH A STRESS APPLIED NI PLATED LAYER

(71) Applicant: Murata Manufacturing Co., Ltd., Nagaokakyo (JP)

(72) Inventors: Shima Katsube, Nagaokakyo (JP); Yasuhiro Mishima, Nagaokakyo (JP); Yoshiyuki Nomura, Nagaokakyo (JP); Kazuki Yoshino, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 30 days.

(21) Appl. No.: 17/967,929

(22) Filed: Oct. 18, 2022

(65) Prior Publication Data

US 2023/0126382 A1 Apr. 27, 2023

(30) Foreign Application Priority Data

Oct. 26, 2021 (JP) .................................. 2021-174844

(51) Int. Cl.
*H01G 4/232* (2006.01)
*H01G 4/30* (2006.01)

(52) U.S. Cl.
CPC ............. *H01G 4/2325* (2013.01); *H01G 4/30* (2013.01)

(58) Field of Classification Search
CPC ............................... H01G 4/30; H01G 4/2325
See application file for complete search history.

(56) References Cited

U.S. PATENT DOCUMENTS

| 2009/0268374 | A1* | 10/2009 | Motoki | H01G 4/30 361/321.2 |
| 2015/0318111 | A1* | 11/2015 | Lee | H01G 4/2325 29/25.03 |
| 2017/0092424 | A1* | 3/2017 | Morito | H01G 4/224 |
| 2019/0304683 | A1* | 10/2019 | Terashita | H01G 4/228 |
| 2020/0098523 | A1* | 3/2020 | Shin | H01G 4/30 |

FOREIGN PATENT DOCUMENTS

| JP | 11-162771 A | 6/1999 |
| JP | 2003318059 A | 11/2003 |
| JP | 2016009836 A * | 1/2016 |

OTHER PUBLICATIONS

Official Communication issued in corresponding Chinese Patent Application No. 202211250400.9, mailed on Sep. 27, 2024.

* cited by examiner

*Primary Examiner* — David M Sinclair
(74) *Attorney, Agent, or Firm* — Keating & Bennett, LLP

(57) ABSTRACT

A multilayer ceramic capacitor includes a multilayer body including ceramic layers and internal electrode layers laminated therein, a pair of external electrodes electrically connected to the internal electrode layers and provided on two end surfaces of the multilayer body. The pair of external electrodes each include a base electrode layer including a metal component, an electrically conductive resin layer on the base electrode layer and including a thermosetting resin and a metal component, and a Ni-plated layer on the electrically conductive layer. A stress of about −150 MPa or more and about 50 MPa or less is applied to the Ni-plated layer, and an end portion of the Ni-plated layer being in contact with the multilayer body.

8 Claims, 6 Drawing Sheets

III—III CROSS SECTION

MULTILAYER CERAMIC ELECTRONIC COMPONENT WITH A STRESS APPLIED NI PLATED LAYER

CROSS REFERENCE TO RELATED APPLICATIONS

This application is based on and claims the benefit of priority from Japanese Patent Application No. 2021-174844, filed on Oct. 26, 2021, the entire contents of which are hereby incorporated herein by reference.

BACKGROUND OF THE INVENTION

1. Field of the Invention

The present disclosure relates to a multilayer ceramic electronic component.

2. Description of the Related Art

In recent years, ceramic electronic components such as multilayer ceramic capacitors have been used in more severe environments than in the past.

For example, electronic components used in mobile devices such as mobile phones and portable music players are required to withstand impact when dropped.

Specifically, it is necessary to prevent the electronic components from falling off from the mounting board or to prevent cracks from occurring in the electronic components even when a drop impact is applied.

Furthermore, electronic components used in vehicle-mounted equipment such as an ECU (Electronic Control Unit) are required to withstand the shock of thermal cycling.

Specifically, it is necessary to prevent cracks from occurring in the electronic components even when the electronic component is subjected to bending stress generated by thermal expansion and contraction of the mounting board due to thermal cycling.

In response to this, it has been proposed to use a thermosetting resin paste for an external electrode of a ceramic electronic component.

For example, in Japanese Unexamined Patent Application Publication No. H11-162771, an epoxy-based thermosetting resin layer is provided between a conventional electrode layer and a Ni-plated layer, and measures are taken so that cracks do not occur in the capacitor main body even in a severe environment (improvement of bending resistance).

In such a configuration, when stress due to an impact at the time of dropping or a bending stress generated by thermal expansion of the mounting board due to thermal cycling occurs, the stress transmitted to the mounting board (warp of the mounting board) is released by separating the stress between the electrode layer and the epoxy-based thermosetting resin layer with the tip of the epoxy-based thermosetting resin as a starting point, and cracks are prevented from being generated in the ceramic electronic component main body (multilayer body).

However, in the multilayer ceramic electronic component disclosed in Japanese Unexamined Patent Application Publication No. H11-162771, Ag and Cu are generally used as the metal powder used in the thermosetting resin layer. However, Ag and Cu are elements which are likely to cause migration. Therefore, there is a concern that external electrodes provided at both ends of the multilayer ceramic electronic component may be in electrical conduction with each other due to the occurrence of migration, thereby causing a short circuit of the multilayer ceramic electronic component.

In addition, the migration is caused by a mechanism such as that described below.

When a voltage is applied to the external electrode of the multilayer ceramic electronic component, Ag is ionized on the anode side and water is decomposed into ions.

These ionized Ag and hydroxide ions react to form AgOH.

AgOH becomes silver oxide by decomposition and migrates to the cathode side by becoming colloidal.

Ag is deposited by ionization of silver oxide and transfer of electrons.

SUMMARY OF THE INVENTION

Preferred embodiments of the present invention provide multilayer ceramic electronic components that are each able to reduce or prevent the occurrence of ion migration while effectively reducing or preventing cracks in the multilayer ceramic electronic components.

A multilayer ceramic electronic component according to a preferred embodiment of the present invention includes a multilayer body that includes a plurality of laminated ceramic layers, and includes a first main surface and a second main surface which are opposed to each other in a height direction, a first side surface and a second side surface which are opposed to each other in a width direction orthogonal or substantially orthogonal to the height direction, and a first end surface and a second end surface which are opposed to each other in a length direction orthogonal or substantially orthogonal to the height direction and the width direction, first internal electrode layers that are provided on the plurality of ceramic layers and exposed at the first end surface, second internal electrode layers that are provided on the plurality of ceramic layers and exposed at the second end surface, a first external electrode that is electrically connected to the first internal electrode layers, and is provided on the first end surface, a portion of the first main surface, a portion of the second main surface, a portion of the first side surface, and a portion of the second side surface, and a second external electrode that is electrically connected to the second internal electrode layers, and is provided on the second end surface, a portion of the first main surface, a portion of the second main surface, a portion of the first side surface, and a portion of the second side surface. The first external electrode and the second external electrode each include a base electrode layer including a metal component, an electrically conductive resin layer provided on the base electrode layer, the electrically conductive resin layer including a thermosetting resin and a metal component, and a Ni-plated layer provided on the electrically conductive layer, and a stress is applied to the Ni-plated layer, the stress being about −150 MPa or more and about 50 MPa or less, and an end portion of the Ni-plated layer being in contact with the multilayer body.

In the multilayer ceramic electronic components according to preferred embodiments of the present invention, a stress is applied to the Ni-plated layer provided on the electrically conductive resin layer, the stress being about −150 MPa or more and about 50 MPa or less, and the end portion of the Ni-plated layer being in contact with the multilayer body.

With such a configuration, the Ni-plated layer and the multilayer body can be reliably brought into contact with each other, and the gap between the multilayer body and the Ni-plated layer can be sealed.

Therefore, the precipitation route of Ag can be blocked while maintaining the advantageous effect of reducing or preventing cracks in the multilayer ceramic electronic component, and ion migration can be reduced or prevented.

Therefore, it is possible to reduce or prevent ion migration while maintaining the advantageous effect of reducing or preventing cracks inside the multilayer body of the multilayer ceramic electronic component.

According to the preferred embodiments of the present invention, it is possible to provide multilayer ceramic electronic components that are each able to reduce or prevent the occurrence of ion migration while effectively reducing or preventing cracks in the multilayer ceramic electronic components.

The above and other elements, features, steps, characteristics, and advantages of the present invention will become more apparent from the following detailed description of the preferred embodiments with reference to the attached drawings.

DETAILED DESCRIPTION OF THE PREFERRED EMBODIMENTS

1. Multilayer Ceramic Capacitor

As an example of the multilayer ceramic electronic component according to the preferred embodiment of the present invention, a multilayer ceramic capacitor will be described.

Figure 1:
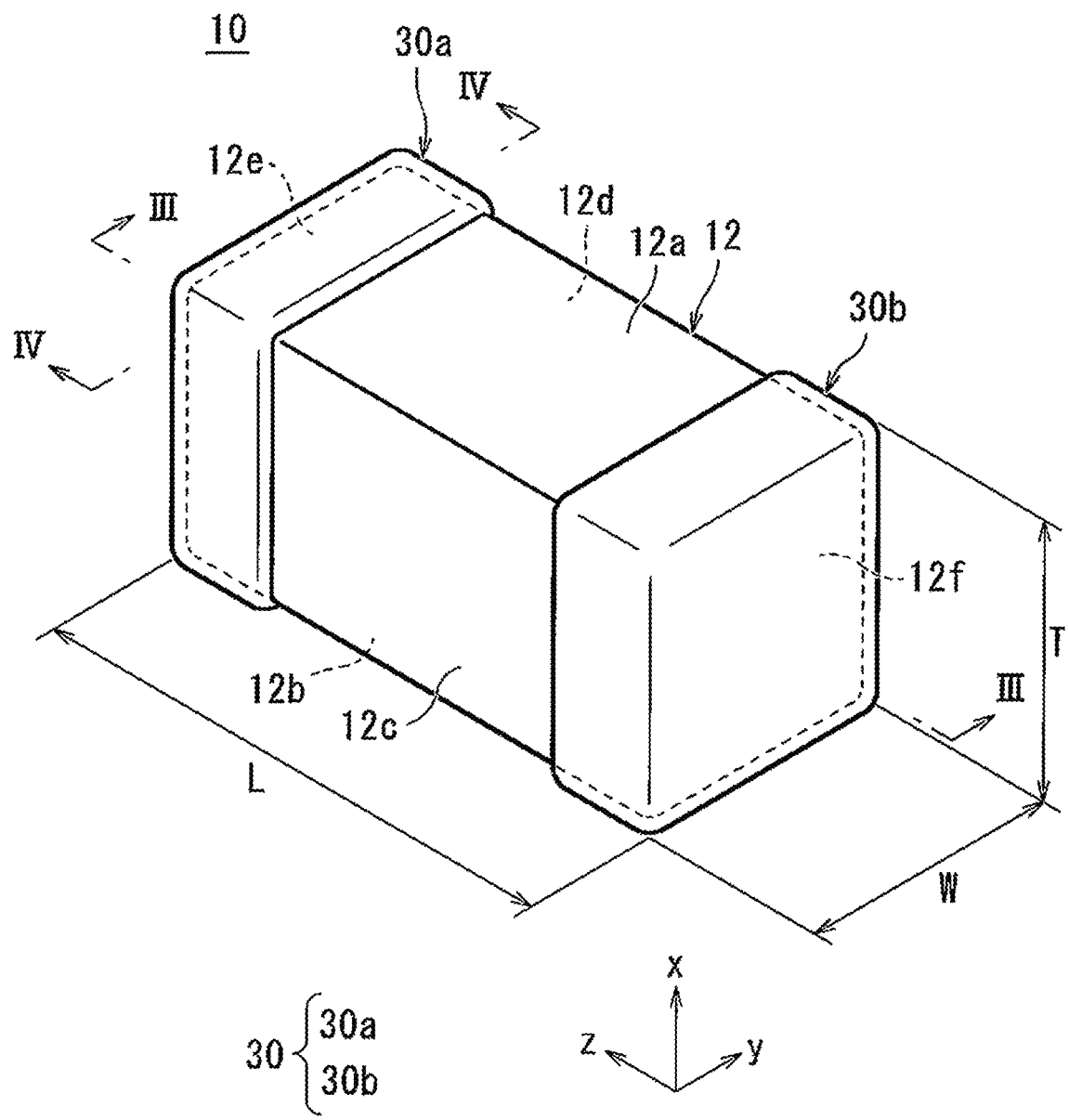
FIG. 1 is an external perspective view showing an example of a multilayer ceramic capacitor as a multilayer ceramic electronic component according to a preferred embodiment of the present invention.

FIG. 1 is an external perspective view showing an example of a multilayer ceramic capacitor as a multilayer ceramic electronic component according to a preferred embodiment of the present invention.

Figure 2:
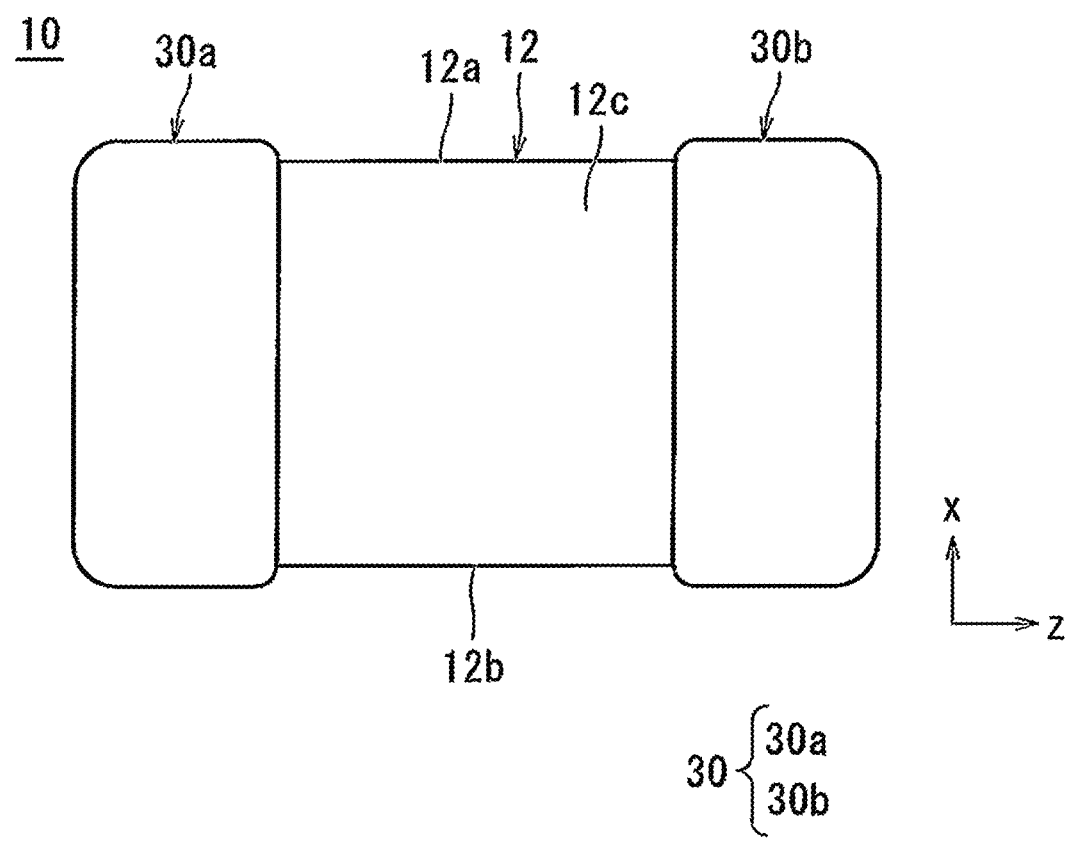
FIG. 2 is a front view showing an example of a multilayer ceramic capacitor as a multilayer ceramic electronic component according to a first preferred embodiment of the present invention.

FIG. 2 is a front view showing an example of a multilayer ceramic capacitor as a multilayer ceramic electronic component according to a first preferred embodiment of the present invention.

Figure 3:
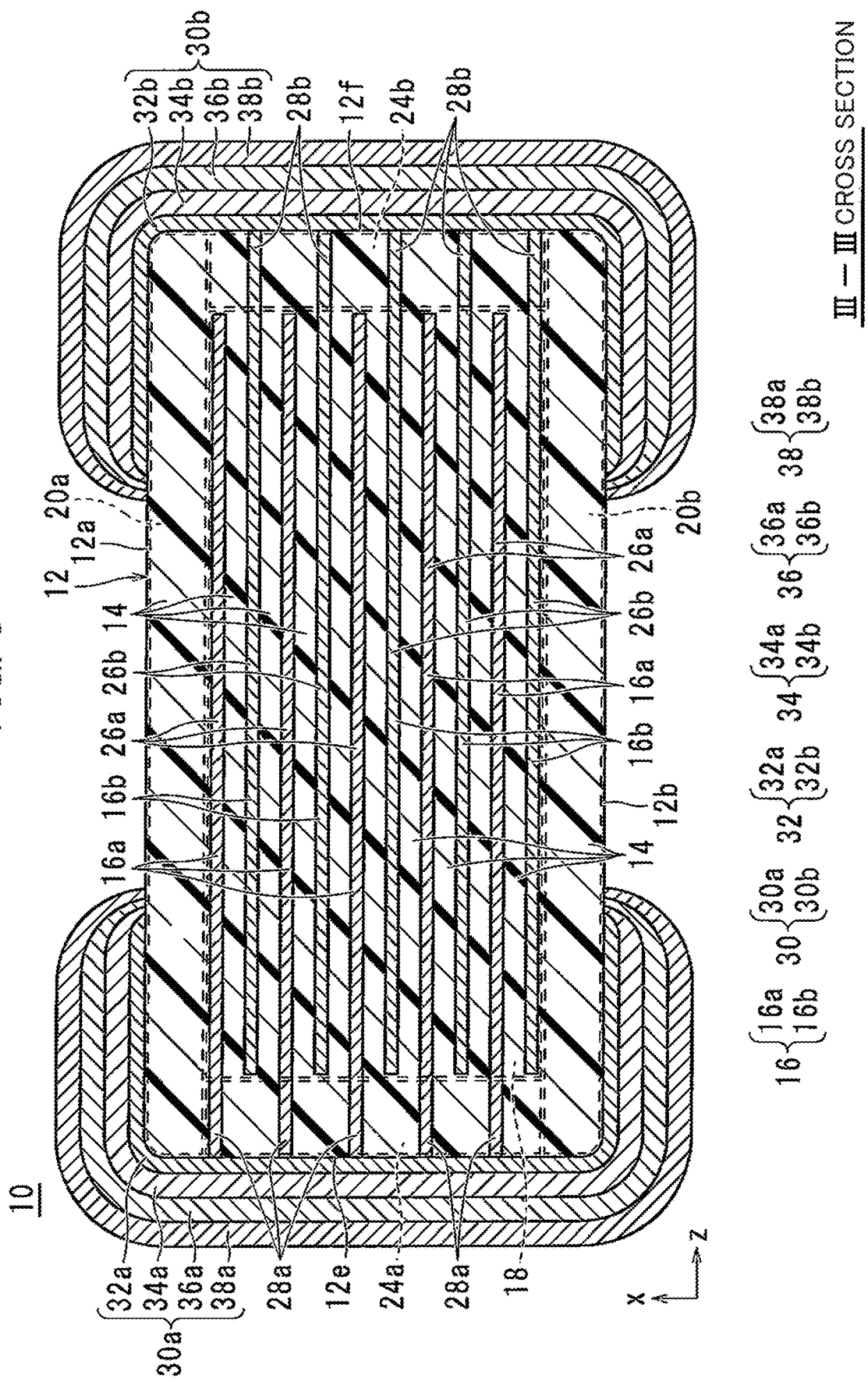
FIG. 3 is a cross-sectional view taken along the line III-III of FIG. 1.

FIG. 3 is a cross-sectional view taken along the line of FIG. 1.

Figure 4:
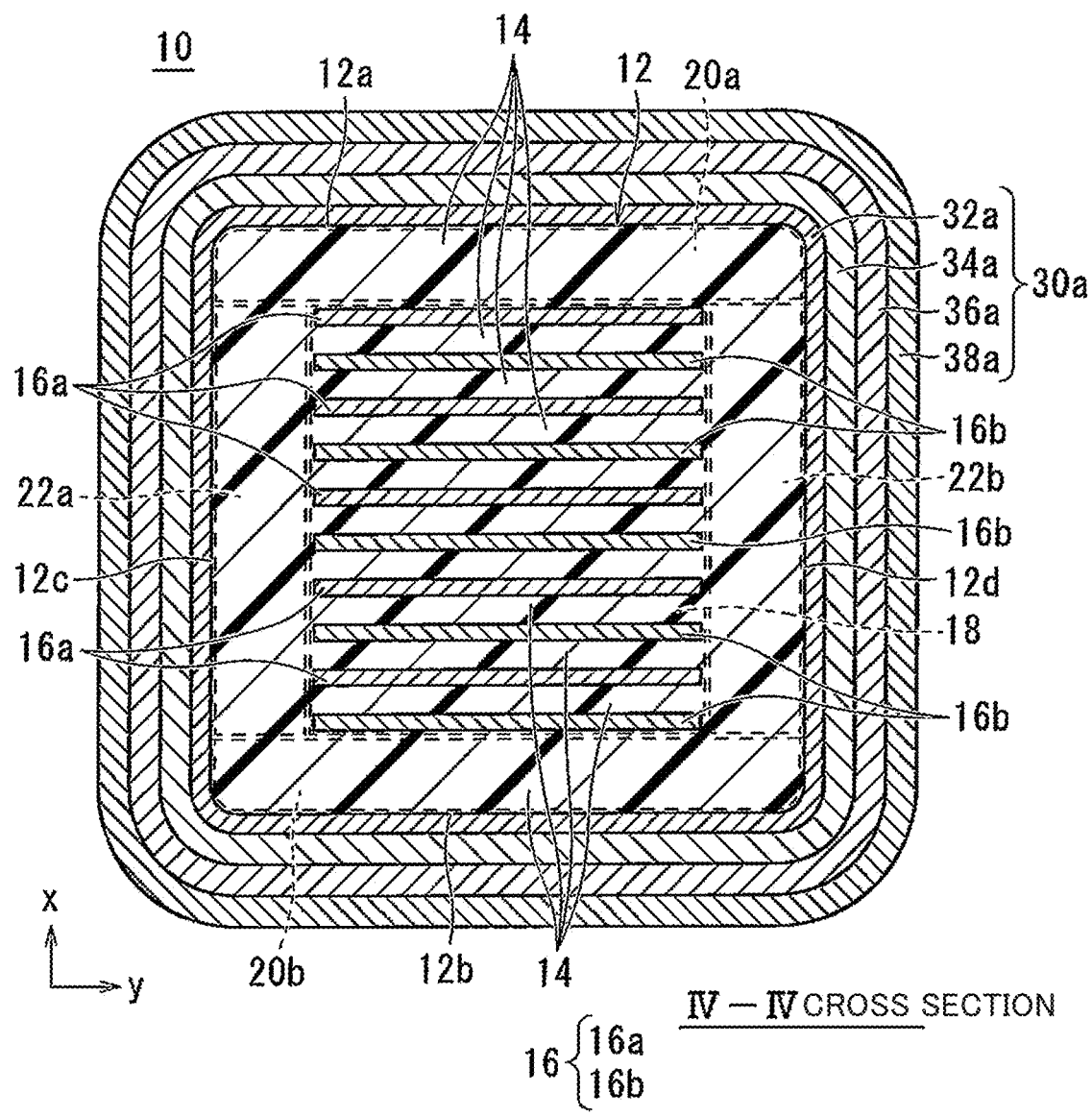
FIG. 4 is a cross-sectional view taken along the line IV-IV of FIG. 1.

FIG. 4 is a cross-sectional view taken along the line IV-IV of FIG. 1.

As shown in FIGS. 1 to 4, a multilayer ceramic capacitor 10 includes a multilayer body 12 having a rectangular parallelepiped shape and external electrodes 30 provided at two ends of the multilayer body 12.

The multilayer body 12 includes a plurality of ceramic layers 14 laminated and a plurality of internal electrode layers 16 laminated on the ceramic layers 14.

Furthermore, the multilayer body 12 includes a first main surface 12a and a second main surface 12b which are opposed to each other in the height direction x, a first side surface 12c and a second side surface 12d which are opposed to each other in the width direction y orthogonal or substantially orthogonal to the height direction x, and a first end surface 12e and a second end surface 12f which are opposed to each other in the length direction z orthogonal or substantially orthogonal to the height direction x and the width direction y.

The multilayer body 12 includes rounded corners and ridges.

The corner portion refers to a portion where three adjacent surfaces of the multilayer body intersect, and the ridge line portion refers to a portion where two adjacent surfaces of the multilayer body intersect.

Furthermore, unevenness or the like may be provided partially or entirely on the first main surface 12a and the second main surface 12b, the first side surface 12c and the second side surface 12d, and the first end surface 12e and the second end surface 12f.

The ceramic layers 14 and the internal electrode layers 16 are laminated (stacked) in the height direction x.

The multilayer body 12 includes an inner layer portion 18 including a single ceramic layer 14 or a plurality of ceramic layers 14 and a plurality of internal electrode layers 16 provided thereon.

The internal electrode layers 16 include first internal electrode layers 16a, each extending toward the first end surface 12e, and second internal electrode layers 16b, each extending toward the second end surface 12f. In the inner layer portion 18, the first internal electrode layers 16a and the second internal electrode layers 16b are opposed to each other with the ceramic layer 14 interposed therebetween.

The multilayer body 12 includes a first main surface-side outer layer portion 20a which is located adjacent to the first main surface 12a, and includes the ceramic layers 14 located between the first main surface 12a, and the outermost surface of the inner layer portion 18 on the side of the first main surface 12a and a straight line extending from the outermost surface of the inner layer portion 18.

Similarly, the multilayer body 12 includes a second main surface-side outer layer portion 20b which is located adjacent to the second main surface 12b, and includes the ceramic layers 14 located between the second main surface 12b, and the outermost surface of the inner layer portion 18 on the side of the second main surface 12b and a straight line extending from the outermost surface of the inner layer portion 18.

The multilayer body 12 includes a first side surface-side outer layer portion 22a which is located adjacent to the first side surface 12c, and includes the ceramic layers 14 located between the first side surface 12c and the outermost surface of the inner layer portion 18 located adjacent to the first side surface 12c.

Similarly, the multilayer body 12 includes a second side surface-side outer layer portion 22b which is located adjacent to the second side surface 12d, and includes the ceramic layers 14 located between the second side surface 12d and the outermost surface of the inner layer portion 18 located adjacent to the second side surface 12d.

The multilayer body 12 includes a first end surface-side outer layer portion 24a which is located adjacent to the first end surface 12e, and includes the ceramic layers 14 located between the first end surface 12e and the outermost surface of the inner layer portion 18 located adjacent to the first end surface 12e.

Similarly, the multilayer body 12 includes a second end surface-side outer layer portion 24b which is located adjacent to the second end surface 12f, and includes the ceramic layers 14 located between the second end surface 12f and the outermost surface of the inner layer portion 18 located adjacent to the second end surface 12f.

The first main surface-side outer layer portion 20a is an aggregate of a plurality of ceramic layers 14 located adjacent to the first main surface 12a of the multilayer body 12 and located between the first main surface 12a and the internal electrode layer 16 closest to the first main surface 12a.

The second main surface side outer layer portion 20b is an aggregate of a plurality of ceramic layers 14 located adjacent to the second main surface 12b of the multilayer body 12 and located between the second main surface 12b and the internal electrode layer 16 closest to the second main surface 12b.

The dimensions of the multilayer body 12 are not particularly limited. However, for example, it is preferable that the dimension in the length direction z is about 0.186 mm or more and about 9.59 mm or less, the dimension in the width direction y is about 0.08 mm or more and about 9.73 mm or less, and the dimension in the height direction x is about 0.08 mm or more and about 9.73 mm or less.

The ceramic layers 14 can be made from, for example, a dielectric material serving as a ceramic material.

As such a dielectric material, for example, a dielectric ceramic containing a component such as $BaTiO_3$, $CaTiO_3$, $SrTiO_3$, or $CaZrO_3$ can be used.

In a case where the dielectric material is included as a main component, depending on the desired characteristics of the multilayer body 12, for example, a material obtained by adding a subcomponent having a content smaller than that of the main component such as a Mn compound, an Fe compound, a Cr compound, a Co compound, or a Ni compound may be used.

When a piezoelectric ceramic material is used for the ceramic layer 14, the multilayer ceramic electronic component defines and functions as a piezoelectric component.

Specific examples of the piezoelectric ceramic material include PZT (lead zirconate titanate) based ceramic materials.

When a semiconductor ceramic material is used for the ceramic layer 14, the multilayer ceramic electronic component defines functions as a thermistor.

Specific examples of the semiconductor ceramic material include spinel-based ceramic materials.

When a magnetic ceramic material is used for the ceramic layer 14, the multilayer ceramic electronic component defines functions as an inductor.

When defining functioning as an inductor, the internal electrode layer 16 becomes a coil conductor.

Specific examples of the magnetic ceramic material include ferrite ceramic materials.

The thickness of the ceramic layer 14 after firing is preferably, for example, about 0.5 μm or more and about 15 μm or less.

The number of the laminated ceramic layers 14 is preferably, for example, 10 or more and 700 or less.

The number of the ceramic layers 14 refers to the total number of the number of the ceramic layers 14 of the inner layer portion 18 and the number of the ceramic layers 14 of the first main surface-side outer layer portion 20a and the second main surface-side outer layer portion 20b.

The multilayer body 12 includes, for example, a plurality of first internal electrode layers 16a and a plurality of second internal electrode layers 16b, each having a rectangular or substantially rectangular shape as the plurality of internal electrode layers 16.

The plurality of first internal electrode layers 16a and the plurality of second internal electrode layers 16b are embedded so as to be alternately provided at equal or substantially equal intervals with the ceramic layers 14 interposed therebetween along the height direction x of the multilayer body 12.

The first internal electrode layers 16a are provided on the plurality of ceramic layers 14 and are positioned inside the multilayer body 12.

The first internal electrode layers 16a each include a first counter electrode portion 26a opposed to the second internal electrode layer 16b, and a first extension electrode portion 28a located on one end side of the first internal electrode layer 16a and extending from the first counter electrode portion 26a to the first end surface 12e of the multilayer body 12.

The first extension electrode portion 28a includes an end portion which extends toward the surface of the first end surface 12e and is exposed at the multilayer body 12.

The shape of the first counter electrode portion 26a of the first internal electrode layer 16a is not particularly limited, but is preferably rectangular or substantially rectangular in a plan view.

However, the corner portion in a plan view may be rounded, or the corner portion may be formed obliquely in a plan view (tapered).

Furthermore, it may have a tapered shape in a plan view in which the surface is sloped toward either side.

The shape of the first extension electrode portion 28a of the first internal electrode layer 16a is not particularly limited, but is preferably rectangular or substantially rectangular in a plan view.

However, the corner portion in a plan view may be rounded, or the corner portion may be formed obliquely in a plan view (tapered).

Further, it may have a tapered shape in a plan view in which the surface is sloped toward either side.

The width of the first counter electrode portion 26a of the first internal electrode layer 16a and the width of the first extension electrode portion 28a of the first internal electrode layer 16a may be the same, or either one of them may be narrower than the other one.

The second internal electrode layers 16b are provided on the plurality of ceramic layers 14 and are positioned inside the multilayer body 12.

The second internal electrode layers 16b each includes a second counter electrode portion 26b opposed to the first internal electrode layer 16a, and a second extension electrode portion 28b located on one end side of the second internal electrode layer 16b and extending from the second counter electrode portion 26b to the second end surface 12f of the multilayer body 12.

The second extension electrode portion 28b includes an end portion which extends toward the surface of the second end surface 12f and is exposed at the multilayer body 12.

The shape of the second counter electrode portion 26b of the second internal electrode layer 16b is not particularly limited, but is preferably rectangular or substantially rectangular in a plan view.

However, the corner portion in a plan view may be rounded, or the corner portion may be formed obliquely in a plan view (tapered).

Furthermore, it may have a tapered shape in a plan view in which the surface is sloped toward either side.

The shape of the second extension electrode portion 28b of the second internal electrode layer 16b is not particularly limited, but is preferably rectangular or substantially rectangular in a plan view.

However, the corner portion in a plan view may be rounded, or the corner portion may be formed obliquely in a plan view (tapered).

Furthermore, it may have a tapered shape in a plan view in which the surface is sloped toward either side.

The width of the second counter electrode portion 26b of the second internal electrode layer 16b and the width of the second extension electrode portion 28b of the second internal electrode layer 16b may be the same, or one of them may be narrower than the other one.

The first internal electrode layer 16a and the second internal electrode layer 16b may each include an appropriate electrically conductive material, such as, for example, metal such as Ni, Cu, Ag, Pd, or Au or an alloy including at least one of them, such as a Ag—Pd alloy.

The thickness of each of the internal electrode layers 16, i.e., the first internal electrode layers 16a and the second internal electrode layers 16b, is preferably, for example, about 0.2 µm or more and about 2.0 µm or less.

Furthermore, the total number of the first internal electrode layers 16a and the second internal electrode layers 16b is preferably, for example, 10 or more and 700 or less.

As shown in FIGS. 1 to 3, external electrodes 30 are provided adjacent to the first end surface 12e and the second end surface 12f of the multilayer body 12.

The external electrodes 30 each include a first external electrode 30a and a second external electrode 30b.

The first external electrode 30a is connected to the first internal electrode layer 16a and is provided at least on the surface of the first end surface 12e.

Furthermore, the first external electrode 30a may extend from the first end surface 12e of the multilayer body 12 and may be provided on a portion of the first main surface 12a and a portion of the second main surface 12b, and also on a portion of the first side surface 12c and a portion of the second side surface 12d.

In this case, the first external electrode 30a is electrically connected to the first extension electrode portion 28a of the first internal electrode layer 16a.

The second external electrode 30b is connected to the second internal electrode layer 16b and is provided at least on the surface of the second end surface 12f.

Furthermore, the second external electrode 30b may extend from the second end surface 12f and may be provided on a portion of the first main surface 12a and a portion of the second main surface 12b, and also on a portion of the first side surface 12c and a portion of the second side surface 12d.

In this case, the second external electrode 30b is electrically connected to the second extension electrode portion 28b of the second internal electrode layer 16b.

The external electrodes 30 each include a base electrode layer 32 including a metal component, an electrically conductive resin layer 34 including a thermosetting resin and a metal component provided on the base electrode layer 32, and a Ni-plated layer 36 provided on the electrically conductive resin layer 34.

The first external electrode 30a includes a first base electrode layer 32a including a metal component, a first conductive resin layer 34a including a curable resin and a metal component provided on the first base electrode layer 32a, and a first Ni-plated layer 36a provided on the first conductive resin layer 34a.

The second external electrode 30b includes a second base electrode layer 32b including a metal component, a second conductive resin layer 34b including a curable resin and a metal component provided on the second base electrode layer 32b, and a second Ni-plated layer 36b provided on the second conductive resin layer 34b.

In the multilayer body 12, the first counter electrode portion 26a of the first internal electrode layer 16a and the second counter electrode portion 26b of the second internal electrode layer 16b are opposed to each other with the ceramic layer 14 interposed therebetween, such that a capacitance is provided.

Therefore, a capacitance can be obtained between the first external electrode 30a to which the first internal electrode layer 16a is connected and the second external electrode 30b to which the second internal electrode layer 16b is connected to provide capacitance characteristics.

Furthermore, as shown in FIG. 5, the multilayer body 12 shown in FIG. 1 may have a structure in which, in addition to the first internal electrode layers 16a and the second internal electrode layers 16b, floating internal electrode layers 16c which do not extend to either of the first end surface 12e or the second end surface 12f are provided, and the counter electrode portions 26c are divided into a plurality of portions by the floating internal electrode layers 16c.

Figure 5A:
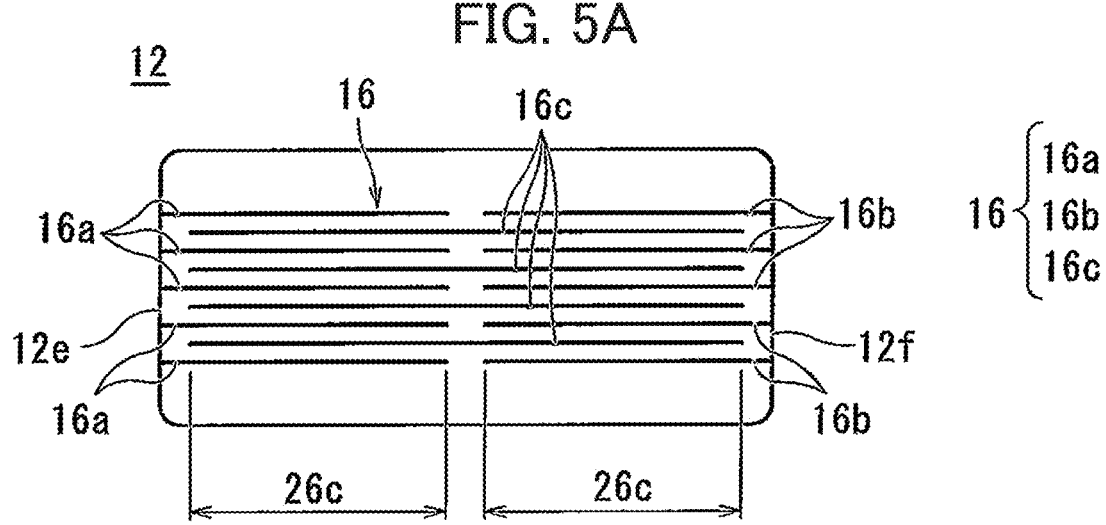
FIG. 5A is a cross-sectional view taken along the line II-II of FIG. 1 showing a structure in which counter electrode portions of inner electrode layers of the multilayer ceramic capacitor according to a preferred embodiment of the present invention are divided into two.
Figure 5B:
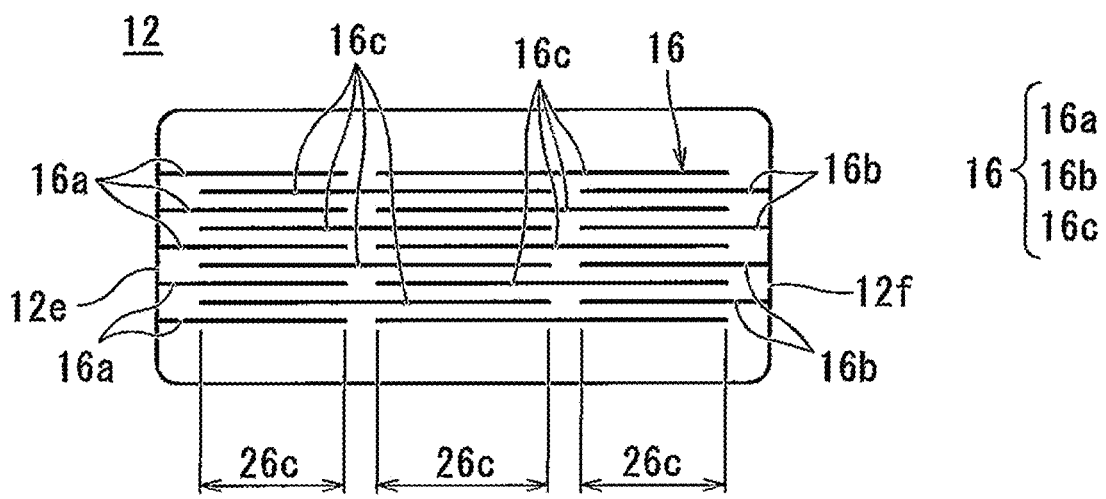
FIG. 5B is a cross-sectional view taken along the line II-II of FIG. 1 showing a structure in which the counter electrode portions of the inner electrode layers of the multilayer ceramic capacitor according to a preferred embodiment of the present invention are divided into three.
Figure 5C:
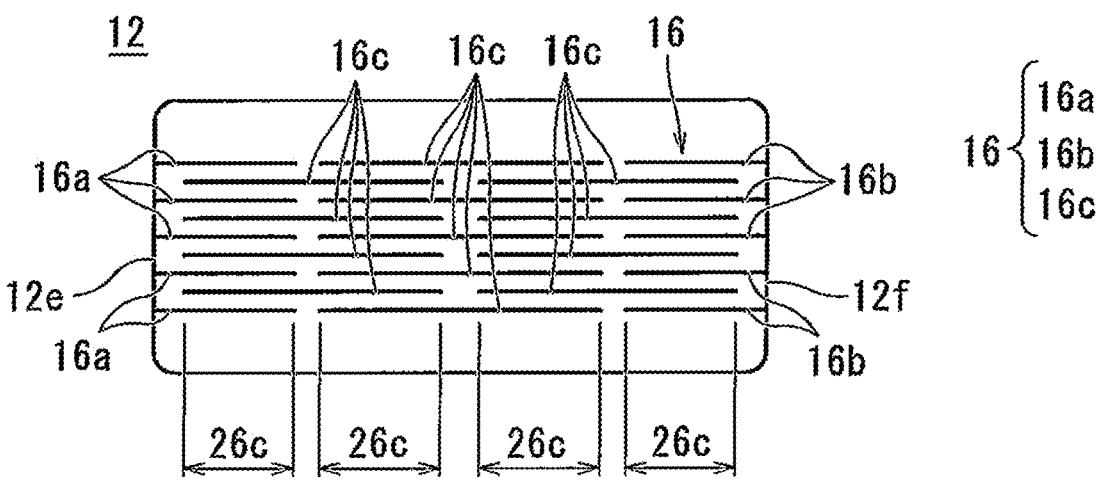
FIG. 5C is a cross-sectional view taken along the line II-II of FIG. 1 showing a structure in which the counter electrode portions of the internal electrode layers of the multilayer ceramic capacitor according to a preferred embodiment of the present invention are divided into four.

For example, the structure may be a two-part structure as shown in FIG. 5A, a three-portion structure as shown in FIG. 5B, or a four-portion structure as shown in FIG. 5C.

By thus dividing the counter electrode portions 26c into a plurality of portions, a plurality of capacitor components are provided between the opposed internal electrode layers 16a, 16b, and 16c, and these capacitor components are connected in series.

Therefore, the voltages applied to the respective capacitor components are reduced, and it is possible to increase the withstand voltage of the multilayer ceramic capacitor 10.

The base electrode layer 32 includes a first base electrode layer 32a and a second base electrode layer 32b.

The first base electrode layer 32a is connected to the first internal electrode layer 16a and is provided on the surface of the first end surface 12e.

Furthermore, the first base electrode layer 32a may extend from the first end surface 12e and may be provided on a portion of the first main surface 12a and a portion of the second main surface 12b, and also on a portion of the first side surface 12c and a portion of the second side surface 12d.

In this case, the first base electrode layer 32a is electrically connected to the first extension electrode portion 28a of the first internal electrode layer 16a.

The second base electrode layer 32b is connected to the second internal electrode layer 16b and is provided on the surface of the second end surface 12f.

Furthermore, the second base electrode layer 32b may extend from the second end surface 12f and may be provided on a portion of the first main surface 12a and a portion of the second main surface 12b, and also on a portion of the first side surface 12c and a portion of the second side surface 12d.

In this case, the second base electrode layer 32b is electrically connected to the second extension electrode portion 28b of the second internal electrode layer 16b.

The base electrode layer 32 includes a metal component.

Furthermore, the base electrode layer 32 preferably includes, for example, a glass component or a ceramic component.

Thus, the adhesion between the multilayer body 12 and the base electrode layer 32 can be improved.

Furthermore, the base electrode layer 32 may include both a glass component and a ceramic component.

The metal component included in the base electrode layer 32 preferably includes, for example, at least one selected from Cu, Ni, Ag, Pd, Ag—Pd alloy, Au, and the like.

The glass component included in the base electrode layer 32 includes, for example, at least one selected from B, Si, Ba, Mg, Al, Li, and the like.

As the ceramic component, the same kind of ceramic material as the ceramic layer 14 may be used, or different kinds of ceramic materials may be used.

The ceramic component preferably includes, for example, at least one selected from $BaTiO_3$, $CaTiO_3$, $(Ba, Ca)TiO_3$, $SrTiO_3$, $CaZrO_3$, and the like.

The base electrode layer 32 may include a plurality of layers.

In a case in which the base electrode layer 32 includes a metal component and a glass component, the base electrode layer 32 may be formed by applying an electrically conductive paste including a glass component and a metal component to the multilayer body 12 and firing the paste, and may be formed by simultaneous firing with the internal electrode layer 16, or may be fired after firing the internal electrode layer 16.

The thickness in the length direction z connecting the first end surface 12e and the second end surface 12f at the center of the first base electrode layer 32a in the height direction x located at the first end surface 12e is preferably, for example, about 2 μm or more and about 220 μm or less.

The thickness in the length direction z between the first end surface 12e and the second end surface 12f at the center in the height direction x of the second base electrode layer 32b positioned at the second end surface 12f is preferably, for example, about 2 μm or more and about 220 μm or less.

The thickness in the height direction x between the first main surface 12a and the second main surface 12b at the center in the length direction z between the first end surface 12e and the second end surface 12f of the first base electrode layer 32a positioned at a portion of the first main surface 12a and the second main surface 12b is preferably, for example, about 4 μm or more and about 40 μm or less.

The thickness in the height direction x between the first main surface 12a and the second main surface 12b at the center in the length direction z between the first end surface 12e and the second end surface 12f of the second base electrode layer 32b positioned at a portion of the first main surface 12a and the second main surface 12b is preferably, for example, about 4 μm or more and about 40 μm or less.

The thickness in the width direction y between the first side surface 12c and the second side surface 12d at the center in the length direction z between the first end surface 12e and the second end surface 12f of the first base electrode layer 32a positioned at a portion of the first side surface 12c and the second side surface 12d is preferably, for example, about 4 μm or more and about 40 μm or less.

The thickness in the width direction y between the first side surface 12c and the second side surface 12d at the center in the length direction z between the first end surface 12e and the second end surface 12f of the second base electrode layer 32b positioned at a portion of the first side surface 12c and the second side surface 12d is preferably, for example, about 4 μm or more and about 40 μm or less.

Furthermore, on the base electrode layer 32, the electrically conductive resin layer 34 including a resin component and a metal component provided on the base electrode layer 32 is provided.

The electrically conductive resin layer 34 includes a first conductive resin layer 34a and a second conductive resin layer 34b.

The first conductive resin layer 34a is provided on the first base electrode layer 32a. It is preferable that the first conductive resin layer 34a covers the first base electrode layer 32a and an end portion of the first conductive resin layer 34a is in contact with the multilayer body 12.

The second conductive resin layer 34b is provided on the second base electrode layer 32b. It is preferable that the second conductive resin layer 34b covers the second base electrode layer 32b and an end portion of the second conductive resin layer 34b is in contact with the multilayer body 12.

Since the electrically conductive resin layer 34 contains a thermosetting resin functioning as a resin component, it is more flexible than the base electrode layer 32 made of, for example, a plating film or a fired product of a metal component and a glass component.

Therefore, even when a bending stress is applied to the mounting board and a physical impact or an impact caused by a thermal cycle is applied to the multilayer ceramic capacitor 10, the electrically conductive resin layer 34 functions as a buffer layer and thus, it is possible to prevent cracks from being generated in the multilayer ceramic capacitor 10.

As the thermosetting resin of the electrically conductive resin layer 34, for example, various known thermosetting resins such as epoxy resin, phenoxy resin, phenol resin, urethane resin, silicone resin, and polyimide resin can be used.

Among them, an epoxy resin excellent in heat resistance, moisture resistance, adhesiveness and the like is one of the more suitable resins.

Furthermore, the electrically conductive resin layer 34 preferably includes a curing agent together with the thermosetting resin.

When an epoxy resin is used as the base resin as the curing agent, various known compounds such, for example, as phenolic, amine-based, acid anhydride-based, imidazole-based, active ester-based, and amideimide-based compounds can be used as the curing agent of the epoxy resin.

The metal component included in the electrically conductive resin layer 34 is preferably a metal filler, and preferably contains Ag, for example.

Alternatively, Ag alone, an alloy containing Ag or a metal powder obtained by coating Ag on the surface of the metal powder can be used.

When a metal powder coated with Ag is used, Cu, Ni, Sn, Bi or an alloy powder thereof, for example, is preferably used as the metal powder.

The reason why Ag is used as the metal filler is that Ag is suitable for an electrode material because Ag has the lowest specific resistance among metals, and Ag is not oxidized and has high weatherability because Ag is a noble metal.

This is also because the metal of the base material can be made inexpensive while maintaining the above-described Ag characteristics.

The shape of the metal filler included in the electrically conductive resin layer 34 is not particularly limited.

The metal filler may be spherical, flat, or the like.

The spherical metal powder and the flat metal powder may be mixed.

The average particle size of the metal filler contained in the electrically conductive resin layer 34 is not particularly limited.

The average particle size of the metal filler may be, for example, about 0.3 μm or more and about 10 μm or less.

The average particle size of the metal filler contained in the electrically conductive resin layer 34 can be measured by the following method.

First, the multilayer ceramic capacitor 10 is polished from the first side surface 12c or the second side surface 12d to a position of about ½ W to expose a specific cross section LT.

Alternatively, the multilayer ceramic capacitor 10 is polished to a position of about ½ T from the first main surface 12a or the second main surface 12b to expose a specific cross section LW.

The cross section exposed by the method described above is coated for SEM imaging.

As the coating agent, a component which does not overlap with the components in the metal filler contained in the electrically conductive resin layer is used.

When the metal filler is Ag or Cu, Pt or Au is preferably used as the coating agent.

Then, an SEM image near the center of the end surface of the electrically conductive resin layer is acquired.

Here, the SEM used for photographing is selected so that the particle size of the metal filler included in the electrically conductive resin layer can be distinguished from other components.

As such a SEM, for example, a table SEM, a general-purpose SEM, an FE-SEM, or the like can be used.

As the conditions for acquiring the SEM image, the photographing mode, the acceleration voltage, and the magnification are selected so that an image in which the particle diameter of the metal filler can be clearly understood can be acquired.

As the conditions for acquiring the SEM image, for example, the imaging mode is set as a secondary electron image, the acceleration voltage is set as about 15 kV, and the magnification is set as a magnification in which about 100 fillers are contained.

Subsequently, the captured SEM image is loaded into analysis software (e.g., imageJ, QuickGrain, etc.) which can binarize, the image is binarized, and particles of the metal filler are measured.

As the analysis software for binarizing the SEM image, for example, imageJ, QuickGrain, or the like can be used.

Finally, the average circle equivalent diameter of about 100 metal fillers is calculated, and the average particle size of the metal fillers contained in the first conductive resin layer and the second conductive resin layer is calculated.

The metal filler contained in the electrically conductive resin layer 34 mainly plays a role in conducting the electrically conductive resin layer 34.

Specifically, the metal fillers are brought into contact with each other to form an electrical conduction path inside the electrically conductive resin layer 34.

The thickness of the electrically conductive resin layer 34 is preferably, for example, about 10 μm or more and about 200 μm or less.

Next, the first Ni-plated layer 36a and the second Ni-plated layer 36b, which are the Ni-plated layers 36 provided on the electrically conductive resin layer 34, will be described with reference to FIGS. 3 and 4.

The Ni-plated layer 36 is provided on the electrically conductive resin layer 34 such that an end portion thereof is in contact with the surface of the multilayer body 12.

The first Ni-plated layer 36a includes an end portion in contact with the surface of the multilayer body 12, and is provided so as to cover the first conductive resin layer 34a.

In the present preferred embodiment, the first Ni-plated layer 36a extends from the first end surface 12e and is provided on a portion of the first main surface 12a and a portion of the second main surface 12b, and also on a portion of the first side surface 12c and a portion of the second side surface 12d, and the end portions thereof contact the surface of the multilayer body 12.

The end portion of the second Ni-plated layer 36b is in contact with the surface of the multilayer body 12, and is provided so as to cover the second conductive resin layer 34b.

In the present preferred embodiment, the second Ni-plated layer 36b extends from the second end surface 12f and is also provided on a portion of the first main surface 12a and a portion of the second main surface 12b, and on a portion of the first side surface 12c and a portion of the second side surface 12d, and the end portions thereof contact the surface of the multilayer body 12.

Stress is applied to the first Ni-plated layer 36a and the second Ni-plated layer 36b.

The stress is, for example, about −150 MPa or more and about 50 MPa or less.

When the stress is indicated by a negative magnitude, the compressive stress is exhibited in a direction from the Ni-plated layer 36 toward the multilayer body 12, and when the stress is indicated by a positive magnitude, the tensile stress is exhibited in a direction from the multilayer body 12 toward the Ni-plated layer 36.

Therefore, −150 MPa indicates compressive stress in a direction from the Ni-plated layer 36 toward the multilayer body 12, and 50 MPa indicates tensile stress in a direction from the multilayer body 12 toward the Ni-plated layer 36.

Figure 6:
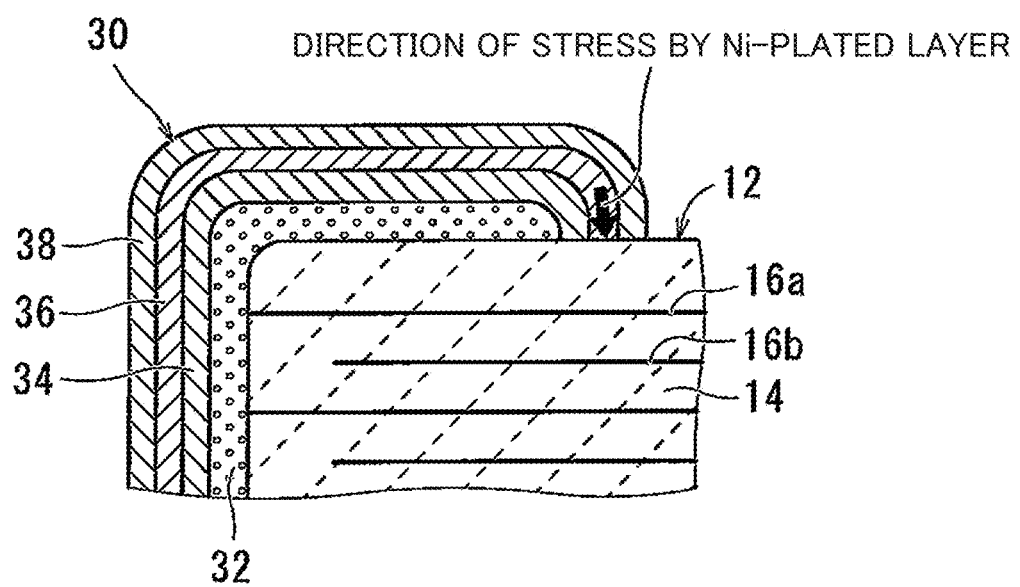
FIG. 6 is a schematic cross-sectional view showing a stress acting on a Ni-plated layer of the multilayer ceramic capacitor.

As shown in FIG. 6, when the Ni-plated layer 36 and the multilayer body 12 are reliably brought into contact with each other, the gap between the multilayer body 12 and the Ni-plated layer 36 can be sealed, such that the precipitation path of Ag can be blocked, and ion migration can be reduced or prevented.

Therefore, it is possible to reduce or prevent ion migration while maintaining the advantageous effect of reducing or preventing cracks in the multilayer ceramic capacitor 10 by the electrically conductive resin layer 34.

When the stress of the Ni-plated layer 36 becomes smaller than about −150 MPa, the compressive stress of the Ni-plated layer 36 becomes large, such that the fastening stress to the multilayer body 12 becomes strong.

Therefore, when external stress is applied, cracks are likely to occur in the multilayer ceramic capacitor, and the mechanical strength of the multilayer ceramic capacitor decreases.

When the stress of the Ni-plated layer 36 becomes larger than about 50 MPa, the tensile stress of the Ni-plated layer becomes large, such that the end portion of the Ni-plated layer 36 rises and the Ni-plated layer 36 floats from the surface of the multilayer body 12.

As a result, a gap is defined at the end portion between the multilayer body 12 and the Ni-plated layer 36, such that a precipitation route of Ag is formed, and ion migration occurs.

Furthermore, the stress applied to the first Ni-plated layer 36a and the second Ni-plated layer 36b is preferably, for example, about −143 MPa or more and about −51 MPa or less.

With such a configuration, the advantageous effect of the present invention can be made more remarkable.

The stress of the Ni-plated layer 36 can be measured by the following method.

First, the multilayer ceramic capacitor 10 is immersed in a Melstrip (HN980M) solution for about 5 minutes, and then washed with water to remove the Sn-plated layer 38 (described later).

Next, measurement is performed using an X-ray diffraction method (μ-XRD) in the range of φ100 μm at the tip portion of the Ni-plated layer 36 positioned on the first main surface 12a or the second main surface 12b or on the first side surface 12c or the second side surface 12d of the multilayer ceramic capacitor 10.

It is understood that the stress of the Ni-plated layer 36 varies depending on the current density.

The current density in the multilayer ceramic capacitor 10 is applied randomly, and at the tip portion of the Ni-plated layer 36 located on the first main surface 12a or the second main surface 12b, or on the first side surface 12c or the second side surface 12d, the average current density applied from the initial stage of forming the Ni plating to the stage of having a thickness of, for example, about 3 μm is the same or substantially the same on any surface as long as it is the tip portion of the Ni-plated layer 36 located on the first main surface 12a or the second main surface 12b, or on the first side surface 12c or the second side surface 12d.

Therefore, the same or substantially the same stress acts on any of the surfaces as long as it is the Ni-plated layer 36 on any of the first main surface 12a, the second main surface 12b, the first side surface 12c, and the second side surface 12d, and the stress is measured at one point for one sample without specifying the measurement surface.

That is, the measurement point of the stress can be the tip portion of the Ni-plated layer 36 located on the first main surface 12a or the second main surface 12b, or on the first side surface 12c or the second side surface 12d at the center in the width direction y or in the height direction x.

The thickness per layer of the first Ni-plated layer 36a and the second Ni-plated layer 36b is preferably, for example, about 1 μm or more and about 15 μm or less.

The Ni-plated layer 36 also prevents the electrically conductive resin layer 34 and the base electrode layer 32 from being eroded by the solder used for mounting when the multilayer ceramic capacitor 10 is mounted on a mounting board or the like.

Furthermore, in the present preferred embodiment, as shown in FIG. 3, the Sn-plated layer 38 is preferably provided on the Ni-plated layer 36.

Specifically, the first Sn-plated layer 38a preferably provided covers the first Ni-plated layer 36a, and the second Sn-plated layer 38b preferably covers the second Ni-plated layer 36b.

With such a configuration, it is possible to improve wettability of solder used for mounting when the multilayer ceramic capacitor 10 is mounted on a mounting board or the like, such that mounting can be easily performed.

The Sn-plated layer 38 may not necessarily be provided.

The thickness per layer of the first Sn-plated layer 38a and the second Sn-plated layer 38b is preferably, for example, about 1 μm or more and about 15 μm or less.

The dimension in the length direction z of the multilayer ceramic capacitor 10 including the multilayer body 12, the first external electrode 30a, and the second external electrode 30b is defined as the dimension L, the dimension in the height direction x of the multilayer ceramic capacitor 10 including the multilayer body 12, the first external electrode 30a, and the second external electrode 30b is defined as the dimension T, and the dimension in the width direction y of the multilayer ceramic capacitor 10 including the multilayer body 12, the first external electrode 30a, and the second external electrode 30b is defined as the dimension W.

For example, the dimensions of the multilayer ceramic capacitor 10 are preferably about 0.2 mm or more and about 10.0 mm or less in the length direction z, about 0.1 mm or more and about 10.0 mm or less in the width direction y, and about 0.1 mm or more and about 10.0 mm or less in the height direction x.

The dimensions of the multilayer ceramic capacitor 10 can be measured by microscope.

The multilayer ceramic capacitor 10 shown in FIG. 1 has a structure in which stress is applied to the Ni-plated layer 36 provided on the electrically conductive resin layer 34, the stress is −150 MPa or more and 50 MPa or less, and an end portion of the Ni-plated layer 36 is in contact with the multilayer body 12.

With such a configuration, the Ni-plated layer 36 and the multilayer body 12 can be reliably brought into contact with each other, and the gap between the multilayer body 12 and the Ni-plated layer 36 can be sealed.

Therefore, the precipitation path of Ag can be blocked while maintaining the advantageous effect of reducing or preventing cracks in the multilayer ceramic capacitor 10, and ion migration can be reduced or prevented.

Therefore, it is possible to reduce or prevent ion migration while maintaining the advantageous effect of reducing or preventing cracks occurring inside the multilayer body 12 of the multilayer ceramic capacitor 10.

2. Method of Manufacturing Multilayer Ceramic Capacitor

Next, a non-limiting example of a method of manufacturing the multilayer ceramic capacitor will be described.

First, a dielectric sheet to form a ceramic layer and an electrically conductive paste to form an internal electrode layer are provided.

The dielectric sheet and the electrically conductive paste for the internal electrode layer include a binder and a solvent.

The binder and the solvent may be known.

Then, the electrically conductive paste for the internal electrode layer is printed on each dielectric sheet in a predetermined pattern by, for example, screen printing or gravure printing.

Thus, a dielectric sheet having a pattern of the first internal electrode layer and a dielectric sheet having a pattern of the second internal electrode layer are provided.

Furthermore, with respect to the dielectric sheet, a dielectric sheet to form the outer layer on which the pattern of the internal electrode layer is not printed is also provided.

Subsequently, a predetermined number of the dielectric sheets for the outer layer on which the pattern of the internal electrode layer is not printed are laminated, such that a portion functioning as the second main surface-side outer layer portion adjacent to the second main surface is formed.

Then, the dielectric sheet on which the pattern of the first internal electrode layer is printed and the dielectric sheet on which the pattern of the second internal electrode layer is printed are sequentially laminated on the portion functioning as the second main surface-side outer layer portion so as to form the structure of the present invention, such that the portion functioning as the inner layer portion is formed.

A predetermined number of dielectric sheets to form the outer layer on which the pattern of the internal electrode layer is not printed are laminated on the portion functioning as the inner layer portion, such that a portion functioning as the first main surface-side outer layer portion adjacent to the first main surface is formed.

Thus, a laminated sheet is produced.

Next, the laminated sheet is pressed in the lamination (stacking) direction by such means as isostatic pressing to form a laminated block.

Then, by cutting the laminated block in pieces with a predetermined size, the laminated chips are cut out.

At this time, the corners and ridges of the laminated chips may be rounded by barrel polishing or the like.

Next, the laminated chips are each fired to form the multilayer body 12.

The firing temperature is preferably, for example, about 900° C. or higher and about 1400° C. or lower, depending on the material of the ceramic layer and the internal electrode layer which are dielectrics.

Subsequently, an electrically conductive paste functioning as a base electrode layer is applied to the first end surface and the second end surface of the multilayer body to form a base electrode layer.

When a fired layer is formed as the base electrode layer, an electrically conductive paste containing a glass component and a metal is applied by a method such as dipping, and then fired to form the base electrode layer.

The temperature of the firing treatment at this time is preferably, for example, about 700° C. or higher and about 950° C. or lower.

When the base electrode layer is formed of a fired layer, the fired layer may contain a ceramic component.

In this case, a ceramic component may be included instead of the glass component, or both of them may be included.

The ceramic component is preferably, for example, a ceramic material of the same kind as the multilayer body.

When a ceramic component is contained in the fired layer, it is preferable that an electrically conductive paste is applied to the laminated chip before firing, and the laminated chip before firing and the electrically conductive paste applied to the laminated chip before firing are fired (baked) at the same time to form a multilayer body in which the fired layer is formed.

The firing temperature at this time is preferably, for example, about 900° C. or higher and about 1400° C. or lower.

Furthermore, an electrically conductive resin layer is formed on the base electrode layer.

As a method of forming the electrically conductive resin layer, an electrically conductive resin paste including a resin component and a metal component is provided, and the electrically conductive resin paste is coated on the base electrode layer by, for example, a dipping method.

Thereafter, heat treatment is performed at a temperature of about 200° C. or more and about 550° C. or less to thermally cure the resin, such that the electrically conductive electrode layer is formed.

At this time, the atmosphere during the heat treatment is preferably, for example, an $N_2$ atmosphere.

In order to prevent scattering of the resin and to prevent oxidation of various metal components, the oxygen concentration is preferably reduced to, for example, about 100 ppm or less.

Next, the Ni-plated layer including the first Ni-plated layer and the second Ni-plated layer are formed on the surface of the electrically conductive resin layer.

As a method of forming the first Ni-plated layer and the second Ni-plated layer, an electrolytic plating method is used.

As the plating method, for example, barrel plating is preferably used.

In order to achieve the stress value of about −150 MPa or more and about 50 MPa or less, which is the stress value of the first Ni-plated layer and the second Ni-plated layer of the present invention, the stress can be controlled by the following method.

It is known that the stress of a plating film exhibits tensile stress in a general watt bath.

On the other hand, a plating additive called a stress relaxation agent or a gloss agent may be used.

It is known that when these additives are used, the stress of the plating film is reduced (compression stress).

Examples of the additives include saccharin, sodium naphthalenesulfonate, butynediol, propargyl alcohol, coumarin, thiourea, and zinc.

By using these additives alone or in combination, it is possible to control the stress of the plating film.

For example, by adding about 1 g/L or more and about 5 g/L or less of a primary gloss agent containing sulfur such as saccharin or sodium naphthalenesulfonate, and about 0.1 g/L or more and about 0.5 g/L or less of a secondary gloss agent such as butyne diol, propargyl alcohol, or coumarin, it is possible to set the internal stress of the Ni-plated film to a compressive stress.

As another method, a Ni-based plating solution of sulfamic acid (sulfamic acid bath) can be used.

The sulfamic acid bath has a characteristic of a low internal stress, and is a plating solution that can be adjusted from a tensile stress to a compressive stress.

Furthermore, it is possible to change to the internal stress by using the above additives.

In the present preferred embodiment shown in FIGS. 1 to 4, the Sn-plated layer is further formed on the Ni-plated layer.

Specifically, the first Sn-plated layer is formed on the first Ni-plated layer, and the second Sn-plated layer is formed on the second Ni-plated layer.

With such a configuration, it is possible to improve wettability of the solder used for mounting when the multilayer ceramic capacitor is mounted on a mounting board or the like, such that mounting can be easily performed.

As a method of forming the Sn-plated layer, for example, an electrolytic plating method is used.

As the plating method, for example, barrel plating is preferably used.

As described above, the multilayer ceramic capacitor 10 according to the present preferred embodiment is manufactured.

3. Experimental Examples

According to the above-described manufacturing method, as the multilayer ceramic electronic components, multilayer ceramic capacitors as samples were fabricated, and the number of occurrences of migration and mechanical strength defects were determined.

With respect to the samples, the samples were each fabricated by controlling the stress of the Ni-plated layer by the above-described manufacturing method so that the stresses shown in Table 1 were obtained, and 46 samples were prepared for each stress condition.

(a) Specification of Samples Used in Experimental Examples

In the experimental examples, multilayer ceramic capacitors having a structure as shown in FIGS. 1 to 4 and having the following specifications were provided.

Dimensions of the multilayer ceramic capacitor (chosen value): L×W×T=about 1.0 mm×about 0.5 mm×about 0.5 mm Material of the main component of the ceramic layers: $BaTiO_3$ Capacitance: about 0.01 µF Rated voltage: about 50 V Specification of external electrode layer Specification of base electrode layer Base electrode layer: Fired layer including an electrically conductive metal and a glass component Electrically conductive metal: Cu Thickness of the base electrode layer The thickness of the base electrode layer at the center in the height direction x of the base electrode layer positioned at the first end surface and the second end surface: about 15 µm The thickness of the base electrode layer at the center in the length direction z of the base electrode layer positioned at the first main surface, the second main surface, and the first side surface and the second side surface (the thickness of the base electrode layer at the center of the e-size center portion): about 4 µm Specification of Conductive Resin Layer Metal Filler: Ag Thermosetting resin component: epoxy Curing temperature of the thermosetting resin: about 200° C.

The thickness of the electrically conductive resin layer at the center in the height direction x of the electrically conductive resin layer positioned at the first end surface and the second end surface: about 20 µm The thickness of the electrically conductive resin layer at the center in the length direction z of the electrically conductive resin layer positioned at the first main surface, the second main surface, and the first side surface and the second side surface (the thickness of the base electrode layer at the center of the e-size center portion): about 20 µm Specification of the plating layer: a two-layer structure in which a Ni-plated layer is provided on an electrically conductive resin layer and a Sn-plated layer is provided on the Ni-plated layer.

Thickness of Ni-plated layer:

The thickness of the Ni-plated layer at the center in the height direction x of the Ni-plated layer positioned at the first end surface and the second end surface: about 2.0 µm The thickness of the Ni-plated layer at the center in the length direction z of the Ni-plated layer positioned at the first main surface, the second main surface, and the first side surface and the second side surface (the thickness of the base electrode layer in the e-size central portion): about 2.0 µm.

Thickness of Sn-plated layer:

The thickness of the Sn-plated layer at the center in the height direction x of the Sn-plated layer positioned at the first end surface and the second end surface: about 1.5 µm The thickness of the Sn-plated layer at the center in the length direction z of the Sn-plated layer positioned at the first main surface, the second main surface, and the first side surface and the second side surface (the thickness of the base electrode layer in the e-size central portion): about 1.0 µm.

(b) Measuring Method of Stress of Ni-Plated Layer

The stress of the Ni-plated layer was measured by the following method.

That is, first, a multilayer ceramic capacitor as a sample was immersed in a Melstrip (NH980M) solution for 5 minutes, and then washed with water to remove the Sn-plated layer.

Next, measurement was performed using an X-ray analysis method (µ-XRD) in the range of φ100 µm at the tip portion of the Ni-plated layer positioned on the first main surface or the second main surface or on the first side surface or the second side surface of the multilayer ceramic capacitor from which the Sn-plated layer was peeled.

It is known that the stress of plating varies depending on the current density.

The current density applied to the multilayer ceramic capacitor acts randomly, and at the tip portion of the Ni-plated layer located on the first main surface or the second main surface, or on the first side surface or the second side surface, the average current density applied from the initial stage of forming the Ni plating to the stage of having a thickness of, for example, about 3 µm is the same or substantially the same on any surface as long as it is the tip portion of the Ni-plated layer located on the first main surface or the second main surface, or on the first side surface or the second side surface.

Therefore, the same or substantially the same stress acts on any of the surfaces as long as it is the Ni-plated layer on any of the first main surface, the second main surface, the first side surface, and the second side surface, and the stress was measured at one point for one sample without specifying the measurement surface.

Specifically, the measurement point of the stress was set as the tip portion of the Ni-plated layer located on the first main surface or the second main surface, or on the first side surface or the second side surface at the center in the width direction y or in the height direction x.

(c) Determination Method of Migration by Wet Load Test

A direct current of about 50 V was applied to the multilayer ceramic capacitor as a sample under an environment of a humidity of about 90% RH or more to about 95% RH and a temperature of about 85° C. to perform a wet load test.

The test period was about 4000 hours.

At this time, the test was performed while measuring the insulation resistance value.

As a result of the test, when the insulation resistance value was about $1×10^6 \Omega$ or less and the dendrite Ag was deposited on at least one of four surfaces of the first main surface, the second main surface, the first side surface, and the second side surface, it was determined that ion migration was found.

The insulation resistance value was measured and the appearance was observed under the following conditions.

Measurement of insulation resistance value

Equipment: IR meter

Measurement time: about 60 seconds

Appearance observation (determination of dendrite-like precipitate)
Equipment: metal microscopy
Field of view: brightfield or polarization
Magnification: about 500×
Appearance observation (determination of Ag)
Equipment: SEM-EDX
Electron image: reflected electrons
Acceleration voltage: about 15 kV
Magnification: about 2000×
Detection element: about Ag (d) Determination Method of Mechanical Strength Failure Test First, a multilayer ceramic capacitor as a sample was mounted on a mounting board having a thickness of about 1.6 mm using a solder paste.

Thereafter, the mounting board was bent from the rear surface of the mounting board on which the multilayer ceramic capacitor was not mounted by a push bar having a radius of curvature of about 1 μm to apply mechanical stress.

At this time, the amount of deflection was set to about 5 mm, and it was kept for about 60 seconds.

After bending the board, the multilayer ceramic capacitor was removed from the mounting board, and cross-sectional polishing was performed to observe the presence or absence of cracks in the inside of the multilayer body.

A crack was observed in the cross section LT or the cross section LW immediately after the polishing was started from the first side surface or the second side surface, or the first main surface or the second main surface of the multilayer ceramic capacitor and the polishing was started from the first side surface or the second side surface, or the first main surface or the second main surface of the multilayer ceramic capacitor, and the cross section LT or the cross section LW was polished to a position where the polishing became about ½W in the width direction y between the first side surface and the second side surface.

Here, those determined to have cracks inside the multilayer body were counted as defective mechanical strength.

(e) Results

Table 1 shows the results of checking the presence or absence of migration in the wet load test and the presence or absence of cracks in the multilayer body in the deflection strength test for each sample.

Samples with sample numbers marked with * in the table are out of the scope of the present invention.

TABLE 1

| SAMPLE No. | STRESS Mpa | NUMBER OF OCCURRENCES OF MIGRATION | NUMBER OF MECHANICAL STRENGTH DEFECTS |
|---|---|---|---|
| ※ 1 | −174 | 0/36 | 8/10 |
| ※ 2 | −165 | 0/36 | 5/10 |
| 3 | −150 | 0/36 | 1/10 |
| 4 | −143 | 0/36 | 0/10 |
| 5 | −134 | 0/36 | 0/10 |
| 6 | −100 | 0/36 | 0/10 |
| 7 | −75 | 0/36 | 0/10 |
| 8 | −51 | 0/36 | 0/10 |
| 9 | −28 | 0/36 | 0/10 |
| 10 | 21 | 1/36 | 0/10 |
| 11 | 50 | 2/36 | 0/10 |
| ※ 12 | 62 | 20/36 | 0/10 |
| ※ 13 | 109 | 29/36 | 0/10 |
| ※ 14 | 124 | 33/36 | 0/10 |

According to Table 1, in the samples of Sample No. 1 and Sample No. 2, mechanical strength defects occurred in 8 out of 10 and 5 out of 10, respectively.

It is considered that this is because, in these samples, the compressive stress of the Ni-plated layer was smaller than −150 MPa and, therefore, the fastening stress to the multilayer body was increased, so that cracks were generated in the multilayer body due to external stress caused by the bending strength test.

In the samples of Sample No. 12 to Sample No. 14, defects due to ion migration occurred in 20 out of 36, 29 out of 36, and 33 out of 36, respectively.

It is considered that this is because, in these samples, since the tensile stress of the Ni-plated layer was greater than 50 MPa, the end portion of the Ni-plated layer was lifted and the surface of the multilayer body was in a floating state, such that a gap was generated at the end portions of the multilayer body and the Ni-plated layer, a result of which a precipitation route of Ag was formed and ion migration occurred.

On the other hand, in the samples of Sample No. 3 to Sample No. 11, since the stress of the Ni-plated layer was about −150 MPa or more and about 50 MPa or less, the number of occurrences of ion migration was 2 or less out of 36 samples, and the number of occurrences of mechanical strength failure was 1 or less out of 10 samples, and good results were obtained.

In particular, in the samples of Sample No. 3 to Sample No. 8, since the stress of the Ni-plated layer was about −143 MPa or more and about −51 MPa or less, the number of occurrences of ion migration was 0 out of 36 samples and the number of occurrences of mechanical strength failure was 0 out of 10 samples, and better results were obtained.

From the above results, according to the multilayer ceramic capacitor of the preferred embodiment of the present invention, by setting the stress of the Ni-plated layer provided on the electrically conductive resin layer to about −150 MPa or more and about 50 MPa or less, the Ni-plated layer and the multilayer body can be reliably brought into contact with each other, and the gap between the multilayer body and the Ni-plated layer can be sealed.

Therefore, it is apparent that the precipitation path of Ag can be blocked and ion migration can be reduced or prevented while maintaining the advantageous effect of reducing or preventing cracks in the multilayer ceramic capacitor.

It was also apparent that, by setting the stress of the Ni-plated layer to about −143 MPa or more and about −51 MPa or less, the advantageous effects of the present preferred embodiment of the present invention can be made more remarkable, and the occurrence of cracks in the multilayer ceramic capacitor and the occurrence of ion migration can be further reduced or prevented.

As described above, the preferred embodiments of the present invention are disclosed in the above description, but the present invention is not limited thereto.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic electronic component comprising:
   a multilayer body including a plurality of laminated ceramic layers, a first main surface and a second main surface opposed to each other in a height direction, a first side surface and a second side surface opposed to each other in a width direction orthogonal or substantially orthogonal to the height direction, and a first end surface and a second end surface opposed to each other in a length direction orthogonal or substantially orthogonal to the height direction and the width direction;

first internal electrode layers on the plurality of ceramic layers and exposed at the first end surface;

second internal electrode layers on the plurality of ceramic layers and exposed at the second end surface;

a first external electrode electrically connected to the first internal electrode layers, and provided on the first end surface, a portion of the first main surface, a portion of the second main surface, a portion of the first side surface, and a portion of the second side surface; and a second external electrode electrically connected to the second internal electrode layers, and provided on the second end surface, a portion of the first main surface, a portion of the second main surface, a portion of the first side surface, and a portion of the second side surface; wherein the first external electrode and the second external electrode each include a base electrode layer including a metal component, an electrically conductive resin layer provided on the base electrode layer, the electrically conductive resin layer including a thermosetting resin and a metal component, and a Ni-plated layer on the electrically conductive resin layer; and a stress of about −143 MPa or more and about −28 MPa or less is applied to the Ni-plated layer, and an end portion of the Ni-plated layer is in contact with the multilayer body.

2. The multilayer ceramic electronic component according to claim 1, wherein the metal component included in the electrically conductive resin layer includes Ag.

3. The multilayer ceramic electronic component according to claim 1, wherein a Sn-plated layer is provided on the Ni-plated layer.

4. The multilayer ceramic electronic component according to claim 1, wherein the base electrode layer includes a glass component or a ceramic component.

5. The multilayer ceramic electronic component according to claim 1, wherein widths of opposing portions of the first internal electrode layers and the second internal electrode layers are the same or substantially the same.

6. The multilayer ceramic electronic component according to claim 1, further comprising floating internal electrode layers which do not extend to either of the first end surface or the second end surface.

7. The multilayer ceramic electronic component according to claim 1, wherein the base electrode layer includes both a glass component and a ceramic component.

8. The multilayer ceramic electronic component according to claim 1, wherein thicknesses of the Ni-plated layer of the first external electrode and the second external electrode are about 1 μm or more and about 15 μm or less.

* * * * *